(12) United States Patent
Yim et al.

(10) Patent No.: US 8,378,799 B2
(45) Date of Patent: Feb. 19, 2013

(54) METHOD AND SYSTEM FOR CODING INFORMATION ON A ROADWAY SURFACE SUBJECT TO MOTION BLUR

(75) Inventors: Raymond Yim, Cambridge, MA (US); Samuel David Perli, Cambridge, MA (US); Fatih Porikli, Watertown, MA (US); Jinyun Zhang, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 622 days.

(21) Appl. No.: 12/640,949

(22) Filed: Dec. 17, 2009

(65) Prior Publication Data
US 2010/0327064 A1 Dec. 30, 2010

Related U.S. Application Data

(63) Continuation-in-part of application No. 12/495,419, filed on Jun. 30, 2009, now Pat. No. 8,174,374.

(51) Int. Cl.
G08B 21/00 (2006.01)

(52) U.S. Cl. ............... 340/425.5; 340/438; 340/905; 382/104

(58) Field of Classification Search ............... 340/425.5, 340/438, 435, 436, 901, 905; 382/104; 404/12
See application file for complete search history.

(56) References Cited

U.S. PATENT DOCUMENTS

| 7,140,803 B2 | 11/2006 | Cummings |
| 7,421,095 B2 | 9/2008 | Ikeda |
| 2006/0132295 A1 | 6/2006 | Gern |
| 2006/0177265 A1 | 8/2006 | Cummings |
| 2007/0198146 A1 | 8/2007 | Ikeda |
| 2007/0225913 A1 | 9/2007 | Ikeda |
| 2007/0258706 A1 | 11/2007 | Raskar |
| 2008/0255724 A1 | 10/2008 | Fechner |

OTHER PUBLICATIONS

Otsu, "A threshold selection method from gray-level histograms," IEEE Trans. Sys., Man., Cyber. 9, pp. 62-66, 1979.

*Primary Examiner* — Jeffery Hofsass
(74) *Attorney, Agent, or Firm* — Gene Vinokur; Dirk Brinkman

(57) ABSTRACT

Symbols in information are encoded as a codeword using a differential orthogonal code. The codeword is stored in a substrate. A moving sensor acquires an image of the codeword in the substrate and decodes the codeword using a balanced differential decoder. The codeword can be painted as lane markings on a road surface.

10 Claims, 6 Drawing Sheets

100

$$H_4 = \begin{bmatrix} 1 & 1 & 1 & 1 \\ 1 & -1 & 1 & -1 \\ 1 & 1 & -1 & -1 \\ 1 & -1 & -1 & 1 \end{bmatrix} \Rightarrow \tilde{H}_4 = \begin{bmatrix} 1 & 0 & 1 & 1 \\ 0 & 1 & 1 & 0 \\ 0 & 0 & 1 & 0 \end{bmatrix}$$

201 → (left matrix); 211 → (columns of right matrix)

*Fig. 2*

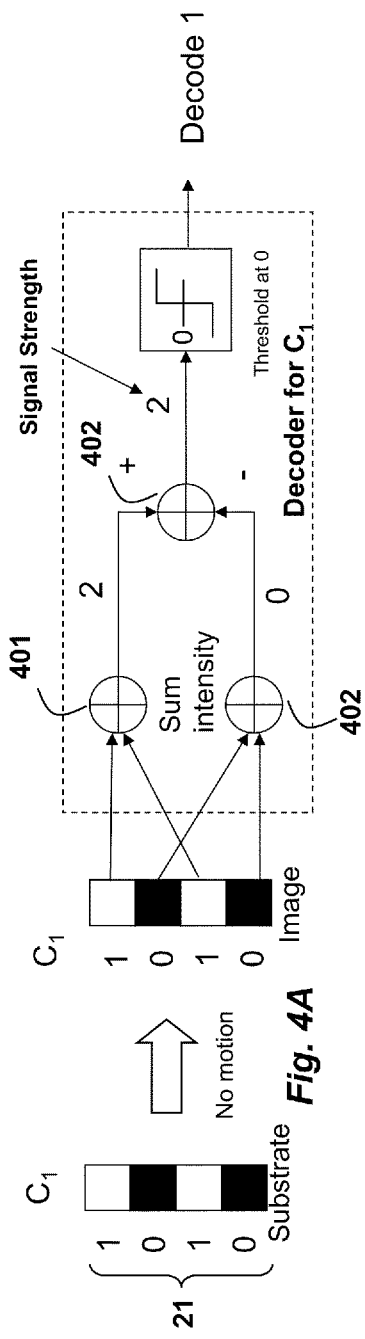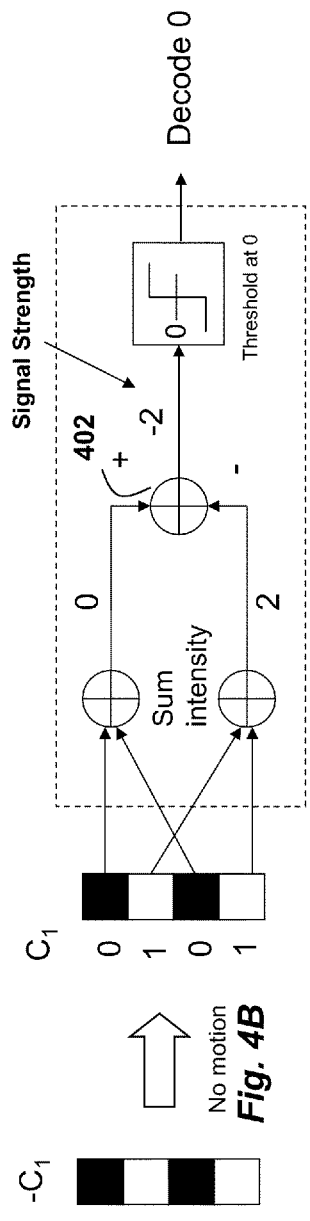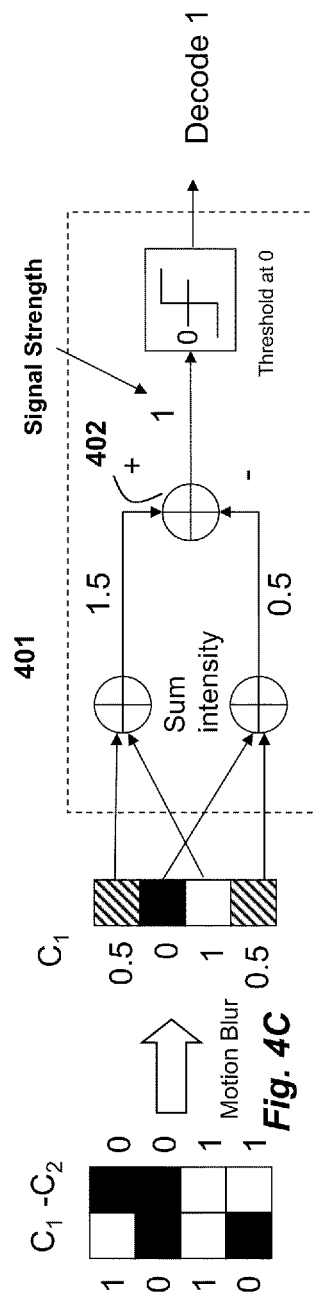

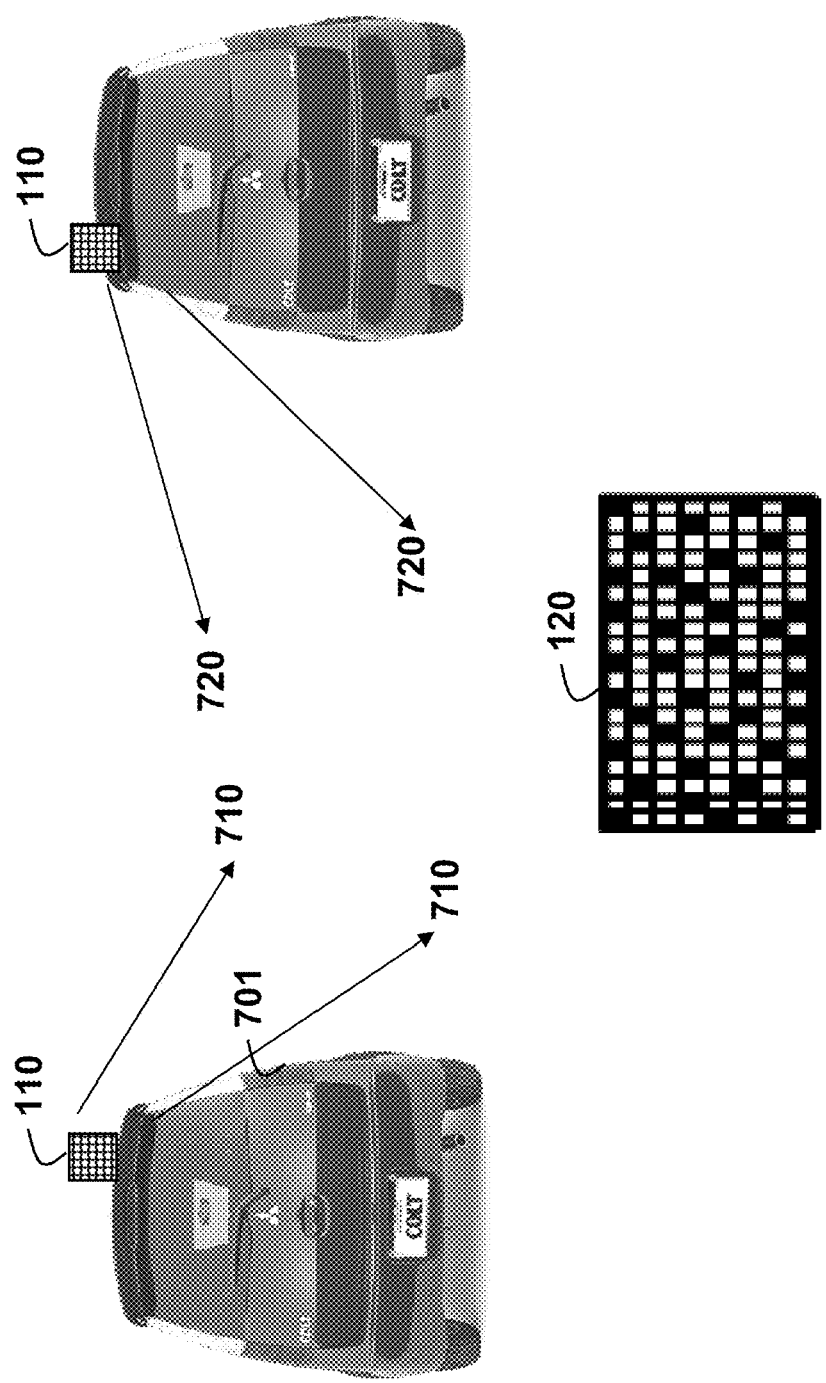

METHOD AND SYSTEM FOR CODING INFORMATION ON A ROADWAY SURFACE SUBJECT TO MOTION BLUR

RELATED APPLICATION

This application is a Continuation-in-Part application Ser. No. 12/495,419, "Method and system for coding digital information in lane markings, filed by Yim et al., on Jun. 30, 2009, now U.S. Pat. No. 8,174,374 and incorporated herein by reference.

FIELD OF INVENTION

This invention relates to coding information, and more particular to encoding and decoding the information such that the effect of motion blur is reduced when the information is acquired by a moving sensor.

BACKGROUND OF THE INVENTION

Lane markings, such as white and yellow lines, guide a vehicle operator along roads. A lane marking recognition system typically uses a camera to acquire images of the markings, and provides feedback to the vehicle or operator to automatically maintain the vehicle in the marked lanes. The markings can also store information as described in the related application.

If the vehicle is moving, then the effect of motion blur is a problem because the image of the marking is integrated on the camera sensor over the time. In the images, motion blur appears as streaked or blurred lines along the direction of motion. If the images include encoded information, the blurring can cause the decoding to fail.

SUMMARY OF THE INVENTION

The embodiments of the invention provide a system and method for reducing the effects of motion blur on coded information in images acquired by a moving camera. More particularly, the information is stored as lane markings on a road surface, and the camera is mounted on a moving vehicle.

Symbols in the information are encoded as a codeword using a differential orthogonal code. The codeword is stored in a substrate. A moving sensor acquires an image of the codeword in the substrate and decodes the codeword using a balanced differential decoder. The codeword can be painted as lane markings on a road surface.

BRIEF DESCRIPTION OF THE DRAWINGS

FIG. 2 is a block diagram of example Hadamard matrices used by an embodiment of the invention;

FIGS. 4A-4B are block diagrams of balanced differential decoders according to embodiments of the invention; and FIG. 5 is a schematic of a spread functions according to embodiments of the invention.

DETAILED DESCRIPTION OF THE PREFERRED EMBODIMENTS

Figure 1:
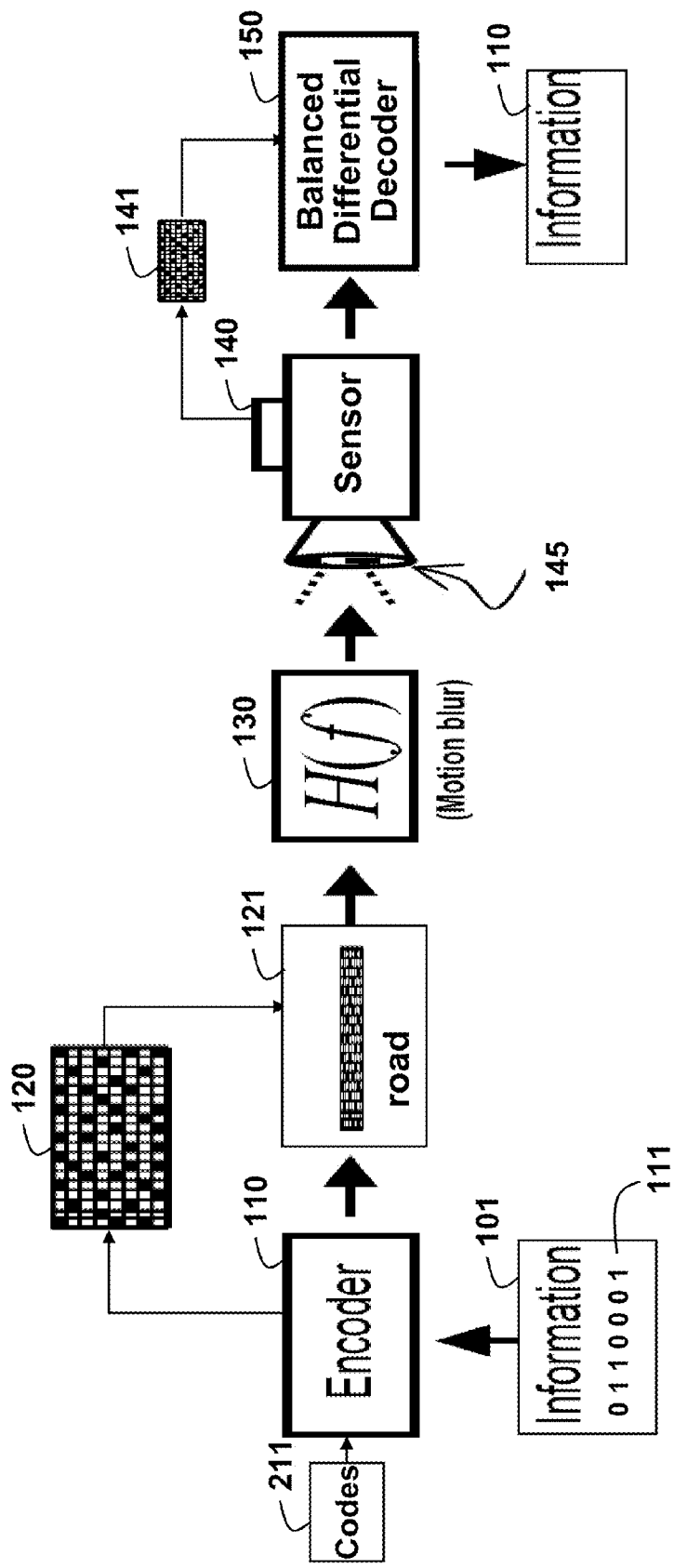
FIG. 1 is a block diagram of a system and method for deblurring coded information in images acquired by a moving camera according to embodiments of the invention.

FIG. 1 shows a system and method 100 for reducing motion blur according to embodiments of the invention. The encoding and decoding steps of the method can be performed in processors including memory and input/output interfaces as known in the art. That is, the processors operate as an image decoder and an information decoder.

Information 101 is in the form of symbols 111. For example, a symbol is a "0" bit, or a "1" bit. Symbols can also be multilevel, for example, 00, 01, 10, and 11. Using codes 211, the symbols of the information 101 are encoded 110 as a codeword 120, and the codeword is stored in a substrate 121. In one embodiment, the substrate is a road surface, and the information is part of lane markings. For example, the information relates to geographical locations, traveling directions, or road conditions. The substrate can also be used with a road sign, an autonomous vehicle transport system, a traffic light, a conveyor belt, a robot, a train, or an unmanned aerial vehicles (UAV), etc.

An image 141 of the codeword 120 is acquired by a sensor 140 mounted on a vehicle. If the vehicle is moving, the image is subject to motion blur H(f) 130. Multiple images can be acquired as the vehicle travels along the road 121 to decode codewords at different locations.

The sensor can be a camera, an infrared camera, a magnetic sensor, and the like, depending on the way the information is stored, as described below.

In the case the sensor is a camera, the camera includes a shutter 145, which can be opened and closed repeatedly while the image is integrated on the camera sensor. It should be noted, that the sensors can be matched with the manner in which the information is stored in the substrate (visibly, infrared, magnetic, and the like).

A decoder extracts the information 110 from the codeword in the image 141 in the presence of the motion blur.

Differential Orthogonal Codes (DOC)

In one embodiment we use a differential orthogonal codes (DOCs) and a balanced differential decoder to reduce the effects of motion blur. The DOC is orthogonal even when subject to mutual interference between codes because orthogonal codes have zero cross-correlation. Example orthogonal codes include Walsh and Gold codes. Differential orthogonal codes have been used in wireless communication networks. However in communication networks, the differential code refers to differences between adjacent transmitted symbols.

We use the orthogonal codes to retrieve the information with a moving camera from painted patches on a road. The receive performs a subtraction operation, in combining various information collected from the painted patches, hence the use of "differential" in the name DOC. We use the same convention as in the communication networks and call the fundamental unit of information a symbol, i.e., one or more bits.

In one embodiment as shown in FIG. 2, we generate our DOC from a Hadamard matrix $H_4$. The Hadamard matrix is a square matrix whose elements are either +1 or −1, and whose rows are mutually orthogonal.

To construct our DOC, we remove the first (all 1's) column 201 from the Hadamard matrix. Each remaining column is a code 211. To encode a "1" symbol for a particular code (column), we retain "1", and set "−1" to zero in the matrix. To encoded a "0" symbol for a particular code, we retain "1" at locations "−1", and set "0" at locations "1". Thus, all matrix elements are non-negative, in contrast with the Hadamard matrix, which also includes negative elements.

This is a general characteristic of all embodiments of our codes in that the invention only deals with non-negative values. This is because the physical measurements of the encoded information are also non-negative. For example, pixels always have some positive or zero intensity. Pixels can never have a negative value for the intensity.

More important, when the intensity is measured at a photodetector, any further observation cannot decrease the intensity. This is very different from observing electric field in typical wireless communications scenario, where further observation of negative electric field would decrease the overall observed value at a decoder.

For example, for the matrix $H_4$, the column-wise codes are $c_1=[1\ -1\ 1\ -1]^T$, $c_2=[1\ 1\ -1\ -1]^T$, $c_3=[1\ 1\ -1\ -1]^T$, where T is transpose operator. To encode a "1" symbol for code $c_1$, we use $[1\ 0\ 1\ 0]^T$. To encode a "0" symbol for code $c_1$, we use $[0\ 1\ 0\ 1]^T$.

Figure 3A:
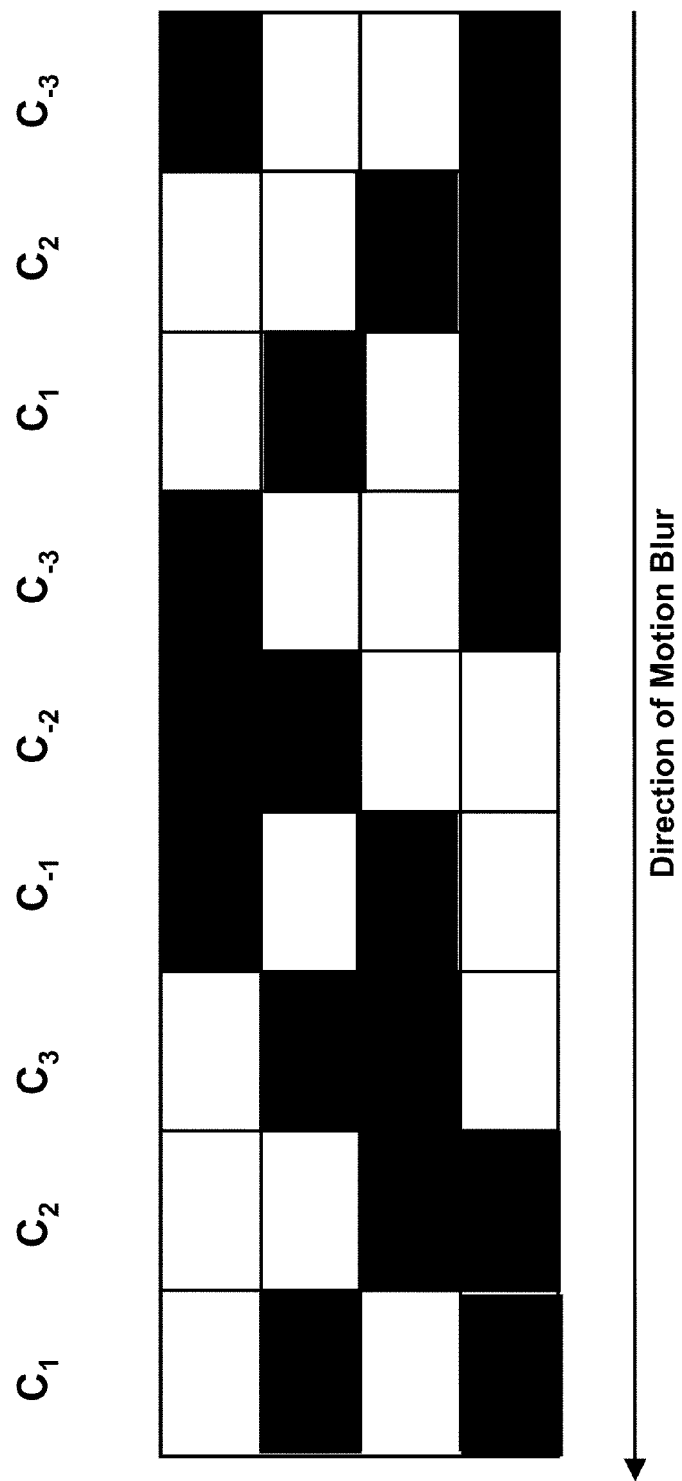
FIG. 3A is a block diagram of a differential orthogonal code according to an embodiment of the invention.

FIG. 3A shows an example differential orthogonal code 301 with four rows in each column. The 4×4 Hadamard matrix is used to generate the DOC. Three orthogonal codes are available. The system selects a predetermined order of using these three codes. In the example, the system uses codes 1, 2 and 3 in a cyclical manner, starting with code 1 for the first bit.

Each column in the matrix corresponds to one bit of information. The codes are mutually orthogonal because the information can be inferred in the presence of motion blur interference by codes in adjacent columns.

To decode the differential orthogonal codes subject to motion blur, we first can optionally deblur the image as described in U.S. Patent Application Publication 2007/0258706, "Method for deblurring images using optimized temporal coding patterns, filed by Raskar et al., on Nov. 8, 2007, incorporated herein by reference. However, that method does not consider the fact that the image includes coded information. Hence, in that method, the specific task of deblurring information is not addressed.

After the optional initial deblurring as described above, we detect marking that includes the encoded digital information using minimal spread thresholding and by corner detection, see Otsu, "A threshold selection method from gray-level histograms," IEEE Trans. Sys., Man., Cyber. 9, pp. 62 –66, 1979, incorporated herein by reference.

The four corners of each lane marking are at maximum distances from the mean of all the corners determined using the naïve corner detection. After determining the boundaries of the marking, the information in the marking is determined by correlating the pixels of each column to pattern for each code.

Balanced Differential Decoder

Figure 3B:
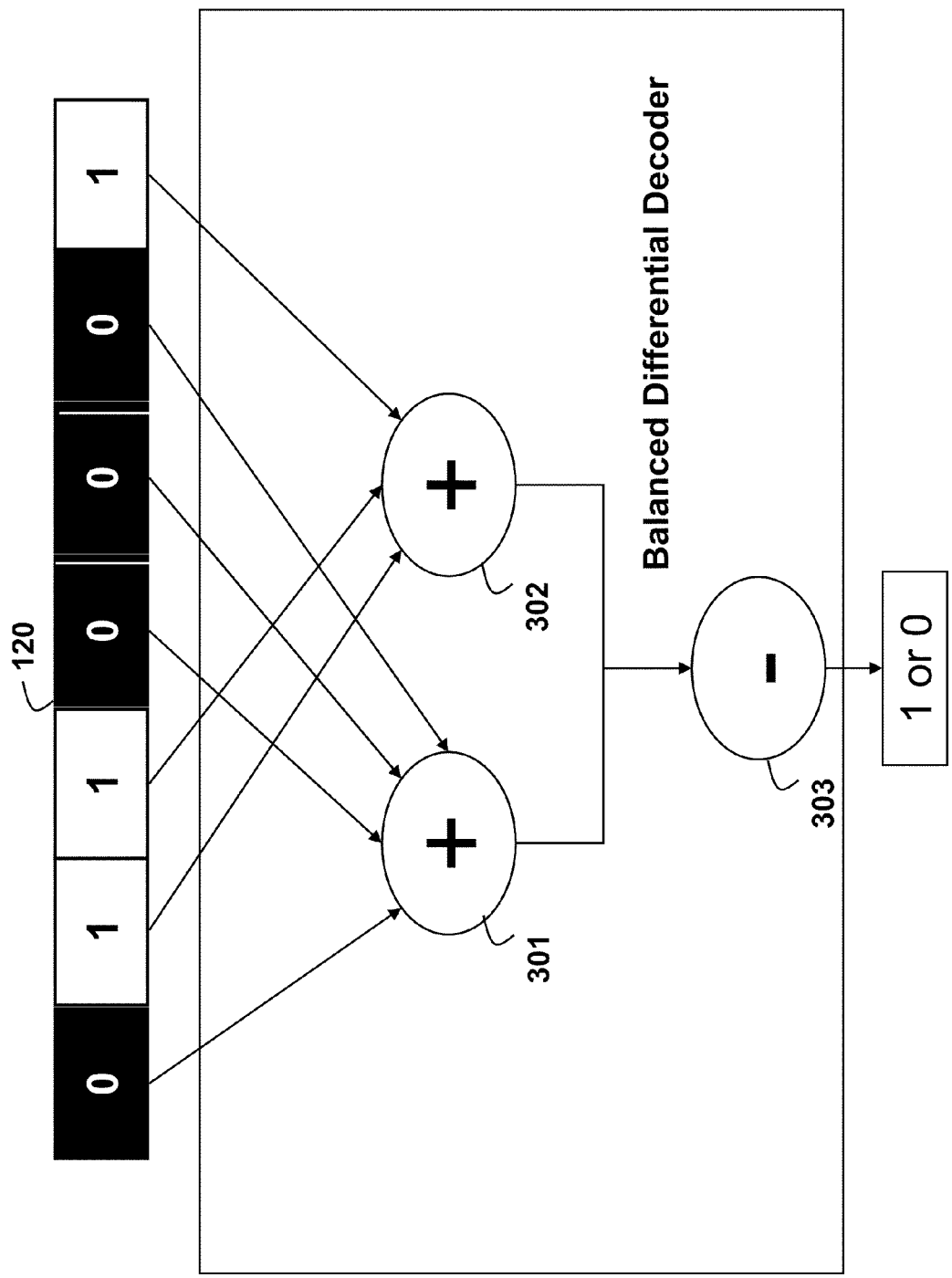
FIG. 3B a schematic of a balanced differential decoder according to embodiments of the invention.

As shown in FIG. 3B, the idea behind our balanced differential decoder is to maximize a difference between white patches in the codeword that are supposed to represent "1" and the black patches that are supposed represent "0" in a particular code, even when the patches are subject to motion blur.

Therefore, the decoder adds all patches that are supposed to be "1" as a first sum 301, and all patches that are supposed to be "0" as a second sum 302. Then, the two sums are subtracted 303 from each other. If the difference is non-negative, the codeword represents a "1", otherwise the codeword represents a "0."

FIGS. 4A and 4B show example arrangements of a balanced differential decoder for the DOC of code 1, when the inputs are bit "1" of code 1 and bit "0" of code 1, respectively. In FIG. 4A, a white-black-white-black patch is painted in the substrate. If the vehicle has no motion, then the image has the white-black-white-black patch exactly as in the substrate. The intensity that is rendered by the device can take on any non-negative value, e.g., 0 –255 in grey scale or color image.

In the example shown in FIG. 4A, we assume that 1 is observed for each white patch, and 0 is observed for each black patch in the codeword 121. Because $c_1=[1\ -1\ 1\ -1]^T$, the balanced decoder sums the intensity from the first and third patch, and sums the intensity from the second and forth patch. Afterwards, the decoder subtracts the two values and 2−0=2. Finally, the decoder threshold the result at 0, so that a non-negative value denotes bit "1", and "0" otherwise. Because 2>0, the decoder concludes the pattern in the substrate corresponds to bit "1".

In FIG. 4B, a black-white-black-white patch is painted in the substrate to denote bit "0" of code 1. With the same balanced differential decoder, we have 0−2=2 after the subtraction. Hence, the decoder concludes the pattern in the substrate corresponds to bit "0".

In FIG. 4C, we show two consecutive bits. Bit "1" is encoded using code 1 and bit "0" is encoded using code 2. The two bits are encoded adjacently in the substrate. In this example, we assume that the vehicle moves so that the image has a mixture of the two bits at the same image pixels, due to motion blur. Using the same balanced differential decoder for code 1, the sum of the first and third values gives 1.5, and the sum of the second and forth values give 0.5. Hence, we have 1.5−0.5=1 after the subtraction, and the decoder concludes the pattern in the substrate corresponds to bit "1".

In FIG. 4C, we see that even when motion causes information encoded by code 1 and code 2 to be mixed together, the differential decoder of code 1 is able to decode information encoded in code 1 successfully. It can be verified that even when information encoded by code 1, code 2 and code 3 are mixed together due to motion blur, the decoder will successfully decode information from code 1. This is due to the orthogonal property of our codes.

Specifically, $c_1=[1\ -1\ 1\ -1]^T$, $c_2=[1\ 1\ -1\ -1]^T$, and $E_1(c)$ is the encoding function of code c for bit 1, and $E_0(c)$ is the encoding function of code c for bit 0. That is, $E_1(c_1)=[1\ 0\ 1\ 0]^T$ (white-black-white-black), and $E_0(c_1)=[0\ 1\ 0\ 1]^T$ (black-white-black-white). Then, the DOC has the following property:

$$\{E_1(c_i), c_j\}=0 \text{ for all } i \neq j, \text{ and}$$

$$\{E_0(c_i), c_j\}=0 \text{ for all } i \neq j,$$

where {a, b} denotes the inner product of a and b, which is implemented by the balanced differential decoder. In the expression, b denotes the wirings of the orthogonal decoder, and a denotes the marking on the substrate, which has only positive or zero value, that is $E_1(c_i)$ and $E_0(c_i)$ have only non-negative values.

Using the above properties, the following effect follows:

$$\{E_a(c_i)+E_b(c_j), c_j\}-\{E_b(c_j), c_j\}=0, \text{ for all } i \neq j, \text{ and } a, b \in \{0, 1\}.$$

This means that by mixing codes i and j in the substrate due to motion blur, the decoded value is the same as if only code i was sensed.

Non-Hadamard-Based DOCs

DOCs need not be generated by Hadamard matrix, and it is possible to relax the orthogonal condition and still general codes that work under motion blur.

For example, consider the following four codes:
$r_1=[1\ 1\ 1\ -1\ -1\ -1]^T$,
$r_2=[1\ -1\ -1\ 1\ 1\ -1]^T$,
$r_3=[-1\ 1\ -1\ 1\ 1\ -1]^T$, and
$r_4=[-1\ -1\ 1\ 1\ -1\ 1]^T$.

To encode bit 1 using $r_1$, the substrate encodes $E_1(r_1)=[1\ 1\ 1\ 0\ 0\ 0]^T$, and to encode bit 0, the substrate encodes $E_0(r_1)=[0$ $0\ 0\ 1\ 1\ 1]^T$. Clearly, the non-negative value constraint is satisfied for marking in the substrate. Also, $$|\{E_1(c_1), c_j\}| \leq 1 \text{ for all } i \neq j,$$

$$|\{E_1(c_1), c_j\}| \leq 1 \text{ for all } i \neq j.$$

Even more generally, the codes would work under motion blur if $$|\{E_1(c_i), c_j\}| < Q \text{ for all } i \neq j, \text{ and}$$

$$|\{E_1(c_j), c_j\}| < Q \text{ for all } i \neq j,$$

where Q is the minimum number of non-zero elements in $E_1(c_i)$ and $E_0(c_i)$. For example $E_1(r_1) = [1\ 1\ 1\ 0\ 0\ 0]^T$ has three non-zero elements, and Q=3.

Using the above properties, $$|\{E_a(c_i) + E_b(c_j), c_j\} - \{E_b(c_j), c_j\}| < Q, \text{ for all } i \neq j, \text{ and } a, b \in \{0, 1\}.$$

Multilevel Codes

The codewords in the substrate do not need to store only zeros and ones symbols. For example, it is possible to encode two bit symbols of the information using each code. Using $c_1 = [1\ -1\ 1\ -1]^T$ from the Hadamard-derived DOC, we can encode the symbols 00, 01, 10, and 11 using the following codes:

$E_{00}(c_1) = [0\ 1\ 0\ 1]^T$
$E_{01}(c_1) = [0\ 2\ 0\ 2]^T$
$E_{10}(c_1) = [1\ 0\ 1\ 0]^T$
$E_{11}(c_1) = [2\ 0\ 2\ 0]^T$.

For example, the values 0, 1 and 2 can be represented by black, grey and white color on the substrate, respectively.

To decode multilevel codes, the balanced differential decoder no longer threshold the decoded values at 0. Instead, the decoder performs a maximum likelihood estimate to determine the most likely bit pattern for the specific code. Nonetheless, the property of the code satisfies the following constraints:

$E_X(c_i)$ has only non-negative values for all symbols X, $$|\{E_1(c_i), c_j\}| < Q \text{ for all } i \neq j, \text{ and}$$

$$|\{E_0(c_i), c_j\}| < Q \text{ for all } i \neq j,$$

where Q is the minimum number of non-zero elements in $E_1(c_i)$ and $E_0(c_i)$.

Directional Blurring

As shown in FIG. 5, depending on the position of the sensor 140 with respect to the marking, a different blurring distortion is observed in the image 151. For example, vehicles 701-702 have different point spread functions (PSF) of the blur, and the encoding can accommodate the two blurring effects. As a result, information for a specific vehicle at a specific location and direction of movement can be arranged such that the above coding schemes apply the basis function orthogonal to the PSF.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for coding information, comprising a processor for performing steps of the method, comprising the steps of:
   defining a code, wherein the code is a differential orthogonal code;
   encoding symbols of the information into a codeword using the code; and
   storing the codeword in a substrate, wherein the substrate is a road surface.

2. The method of claim 1, wherein the codeword is paint on the road surface as lane markings.

3. The method of claim 2, wherein the paint has multiple colors and intensities to represent the symbols of the codeword.

4. The method of claim 1, wherein the information relates to geographical locations.

5. The method of claim 1, wherein the information relates to traveling directions along the road surface.

6. The method of claim 1, wherein the information relates to road conditions.

7. A system for coding information, comprising a processor for performing steps of the method, comprising the steps of:
   means for defining a code, wherein the code is a differential orthogonal code;
   means for encoding symbols of the information into a codeword using the code;
   means for storing the codeword in a substrate, wherein the substrate is a road surface;
   a sensor configured to acquire an image of the codeword in the substrate by a sensor; and
   a balanced differential decoder configured to decode the codeword in the image.

8. The method of claim 7, wherein the sensor is moving relative to the road surface, and the image is subject to motion blur.

9. The method of claim 7, wherein the sensor is a camera mounted on a vehicle traveling on the road surface.

10. The method of claim 7, wherein the sensor is a camera, and wherein the camera detects a location of the lane marking using minimal spread thresholding and by corner detection.

* * * * *